Nov. 14, 1944.                L. NEWCOMB                2,362,581
                          BRAKE COOLING SYSTEM
                         Filed Aug. 14, 1943         2 Sheets-Sheet 1
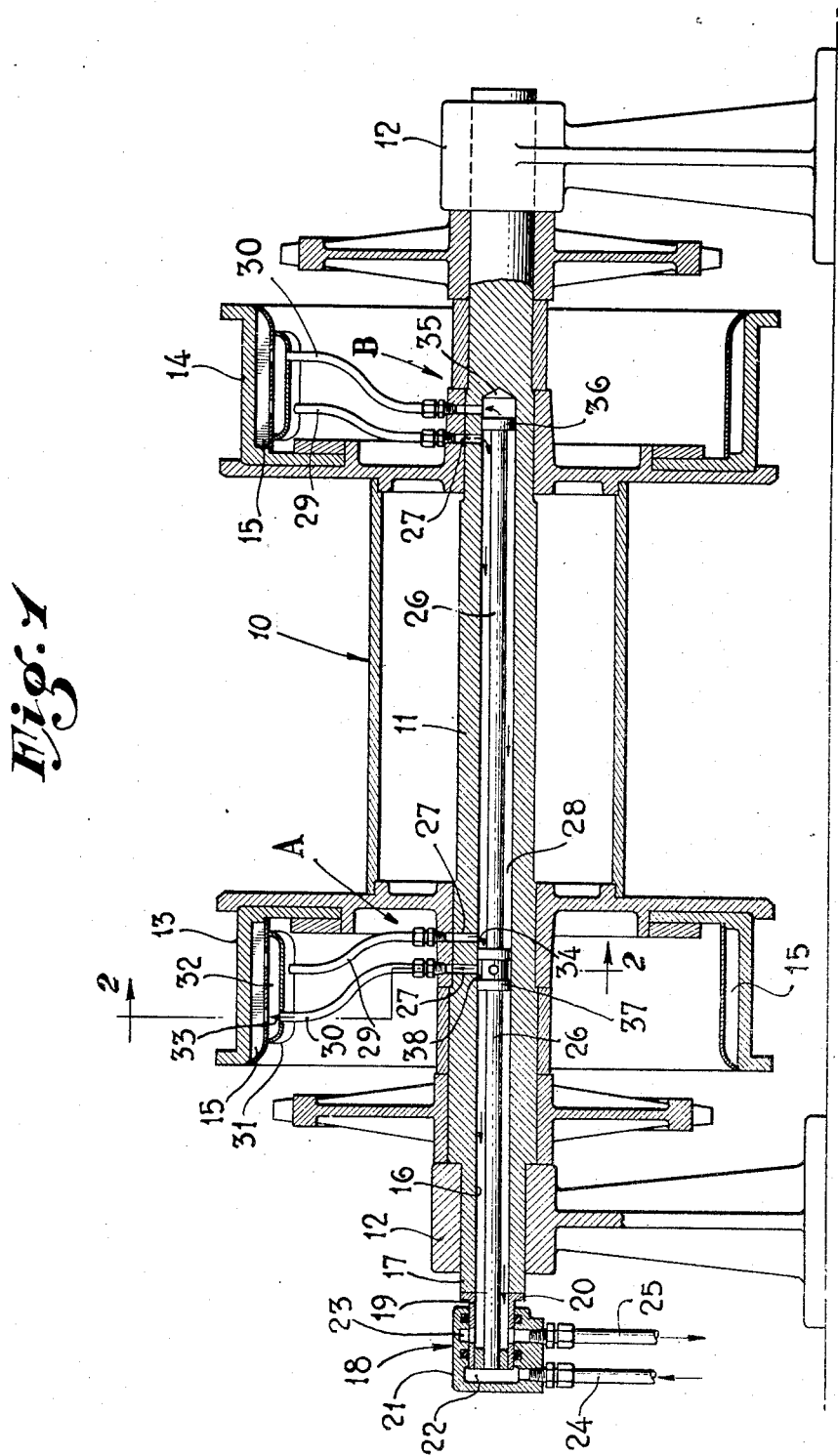
Inventor:
LEROY NEWCOMB,
By
Attorney.

Nov. 14, 1944.   L. NEWCOMB   2,362,581
BRAKE COOLING SYSTEM
Filed Aug. 14, 1943   2 Sheets-Sheet 2
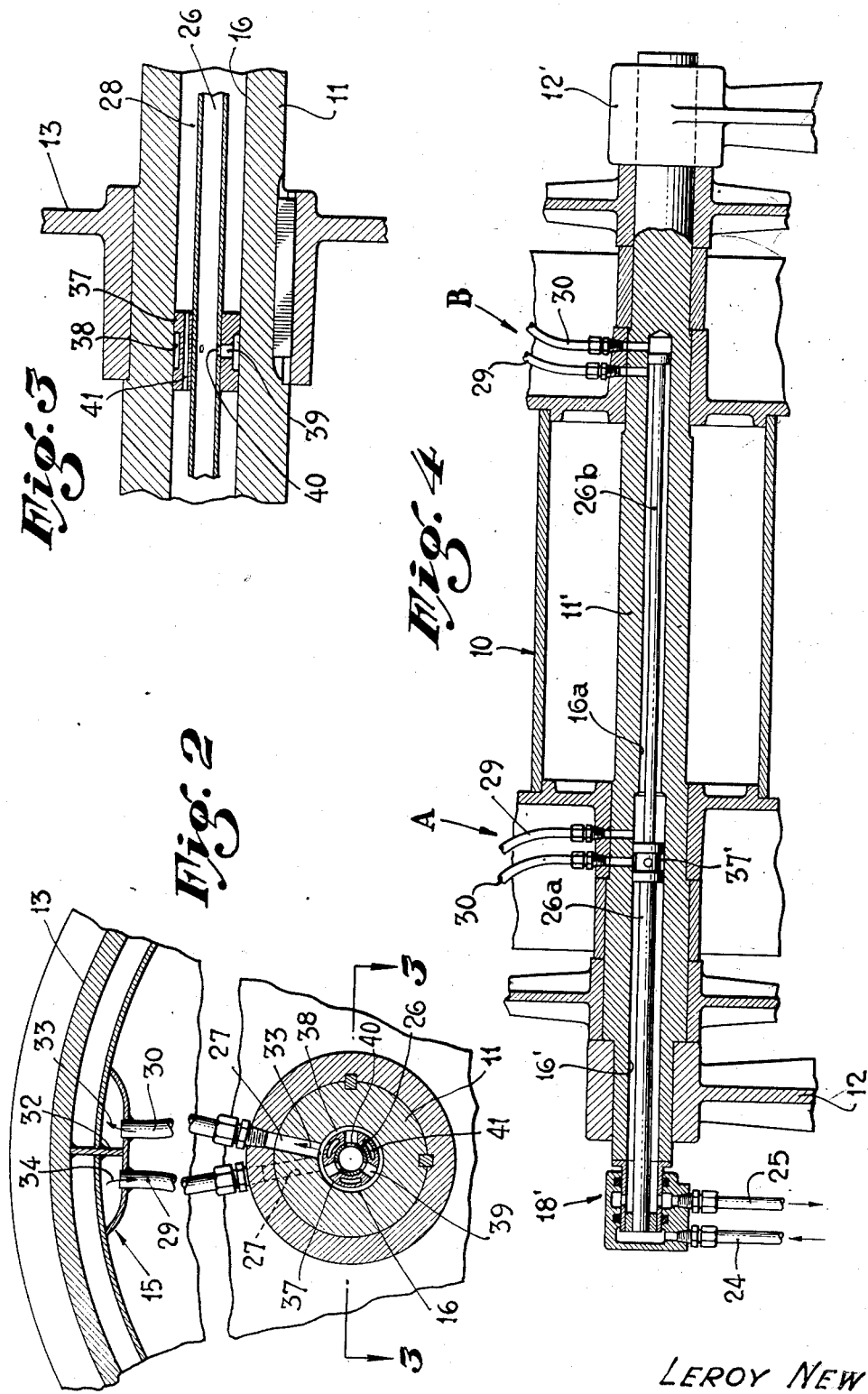
Inventor:
LEROY NEWCOMB,
By
Attorney.

Patented Nov. 14, 1944

2,362,581

UNITED STATES PATENT OFFICE 2,362,581

BRAKE COOLING SYSTEM

Leroy Newcomb, San Gabriel, Calif., assignor to Emsco Derrick & Equipment Company, Los Angeles, Calif., a corporation of California Application August 14, 1943, Serial No. 498,723

11 Claims. (Cl. 188—264)

My invention in general to means for cooling brake drums or rims such as employed in the drawworks of drilling equipment, so as to minimize the liability of overheating of the brakes so as to burn the same, and relates in particular to a simple arrangement whereby the foregoing result is accomplished.

It is an object of the present invention to provide a cooling system for a plurality of brakes having brake rims secured to and rotating with a shaft, this system employing a single opening leading in from the end of the shaft and an improved arrangement of tube and fittings in the shaft's opening for providing within the shaft's opening a pair of passages for inlet and return flow of the water employed for cooling of the brake rims and whereby parallel flows of the water through the brake rims is obtained, so that they are both cooled to substantially the same extent. Old forms of brake cooling devices which are replaced by the present invention include one arrangement wherein openings are extended in from both ends of the shaft on which the brake rims are mounted, this arrangement requiring swivel fittings at both ends of the shaft for conducting flows of cooling water to and from the rotating shaft. Another arrangement includes the use of manifold and pipe distributing means at or within the cable spool to carry the cooling water to and from the brake rims which are disposed at the ends of the cable spool. In the present invention a single opening is drilled into the shaft from one end thereof so that it will pass through the position occupied by one brake rim to a second position which is near to the other brake rim. A tube is extended within this opening so as to pass through the first position to the second position, thereby providing within and around the inserted tube inflow and outflow passages which are respectively connected to the cooling chambers of both brake rims in parallel relation, there being means in the first position for conducting water from the interior of the inserted tube to the brake cooling chamber of the first brake, this means being so constructed that it does not obstruct the flow of liquid through the passage formed between the exterior wall of the inserted tube and the wall of the hole or bore which has been drilled in the tube.

The invention may be used for cooling of frictional brakes or clutches which are employed in multiple upon a rotating shaft, which devices have either cylindric walls frictionally engaged by shoes, or radially disposed walls which are engaged by friction plates or discs.

Further objects and advantages of the invention will be brought out in the following part of the specification.

Referring to the drawings which are for illustrative purposes only,

Fig. 1 is a simplified sectional view showing a drawworks shaft with my invention in use therewith.

Fig. 2 is an enlarged fragmentary section taken as indicated by the line 2—2 of Fig. 1.

Fig. 3 is a section taken on the plane indicated by the line 3—3 of Fig. 2.

Fig. 4 is a fragmentary cross-sectional view showing a drawworks shaft and my invention, wherein the shaft has an opening, the inner portion of which is of reduced diameter.

In Fig. 1 I show a cable spool 10 fixed on a shaft 11 which is supported for rotation by bearings 12. It is a customary practice to mount on this shaft friction devices for either transmitting or absorbing power. For example, in some drawworks one or more friction clutches may be mounted directly upon the cable spool shaft, and in most every instance, one or more brakes are employed which have parts fixed on the shaft so as to rotate therewith. Each of these types of friction devices employs a metal wall of annular form and friction shoes or plates to frictionally engage the metal wall. In some instances the metal wall is radially disposed and in other instances it is cylindrical. In the present disclosure of my invention I show cylindric metal walls 13 and 14 disposed at the ends of the cable spool 10 and being adapted to be engaged by brake bands or shoes which are not shown. These cylindric walls 13 and 14 are ordinarily referred to as the brake rims and are provided with annular cooling chambers 15 through which a cooling fluid or liquid, generally water, is circulated during the period of use of the brakes, so that the heat frictionally generated in the walls 13 and 14 will be absorbed by the flows of water and excessive temperatures are thereby avoided.

From the leftward end of the shaft 11, a hole 16 is drilled inward so that it will pass through the position A of the first brake means represented by the rim 13 to a position B near to or within the second brake means represented by the rim 14. At the end 17 of the shaft 11 there is a swivel fitting 18 comprising a tube 19 which is secured to the end of the shaft by means of a flange 20 so that it will turn with this shaft. Around the tube 19 there is a casing 21 having passages 22 and 23 to which water pipes 24 and 25 are connected. The passage 22 communicates with the interior of the leftward end of the tube 26 which extends through the tube part 19 and then inward through the opening 16 of the shaft 11, and the passage communicates through radial openings 27 in the tube part 19 with the space 28 around the tube 26. Either of the passages 22 and 23 may be used for either inflow or outflow of the water which is to cool the brake rims 13 and 14. The tube 26 divides the interior of the opening 16 of the shaft 11 into two passages, one of which may be employed for inlet flow of water, while the other is employed for the outlet flow.

From the shaft 11, in each of the positions A and B, water conduits 29 and 30 are extended to a fitting 31 through which the water flow may be conducted into and taken from the cooling chamber 15. As shown in Fig. 2, there is a dividing wall 32 extended through the chamber 15 and the inlet fitting 31 so that water which enters as shown by arrows 33 will be caused to pass entirely around the interior space of the associated brake rim before it can leave the cooling chamber 15 as indicated by arrows 34.

The inner end of each conduit 29 communicates with the outer passage 28 consisting of the annular space formed around the tube 26 in the opening 16. As shown in Fig. 1, the conduit 30 in position B communicates with the inner end portion 35 of the opening 16 in the shaft 11 and its mouth is isolated from the mouth of the conduit 29 by a collar 36 fitted around the rightward end of the tube 26 and being of such size as to substantially fill the full diameter of the opening 16. Accordingly, the conduit 30 in the position B communicates through the space 35 with the interior of the tube 26.

In position A a fitting 37 is disposed around the tube 26 in such position that its central portion will coincide with the inner end of the conduit 30 in position A. This fitting 37 comprises a cylindric body having an annular channel 38 intermediate its ends positioned so as to communicate with the inner end of the conduit 30, and has radial openings 39 which connect the annular channel 38 with radial openings 40 in the tube as shown in Fig. 2, so that the passage provided by the interior of the tube will be connected through the openings 40 and 39 and the passage 38 with the inner end of the conduit 30. The fitting 37 is so formed that it will not obstruct the flow of water through the outer passage 28, but has openings 40 parallel to its axis and positioned between the radial openings 39 so that these openings 40 will constitute portions of or continuations of the passage 28. Therefore, if the cooling water is fed into the pipe 24, it will pass inward through the interior of the tube 26. A portion of this water will pass outward through the openings provided by the fitting 37 and through the conduit 30 to the cooling chamber 15 associated with the brake rim 13. A portion of this water will also pass from the rightward end of the tube 26 and through the space 35 at the conduit 30 in position B to the cooling chamber 15 associated with the brake rim 14. Return flows from both of the cooling chambers 15 will pass through the conduit 29 to the outer channel 26 and thence to the pipe 25 at the leftward end of the shaft 11. As indicated by the arrows in Fig. 1, it will be perceived that parallel flows of water pass through the brake rim chambers 15. The entering flow of water divides at the fitting 37 into two parallel flows which separately pass through the brake rim chambers 15. The return flows from the brake rim chambers are recombined into a single flow at the inner end of the conduit 29 in position A, which single flow then passes to the leftward end of the shaft 11 where it is picked up by the return pipe 25 and carried to some suitable means of disposal. It will be recognized that the direction of flows may be reversed through the passages.

In Fig. 4 I show the manner in which the present invention may be employed in a drawworks wherein maximum heavy duty is to be obtained from a structure of minimum weight. Therein the shaft 11' is shown gradually reduced in diameter from its leftward end toward its rightward end so as to provide shoulders against which parts of the device are brought to rest and against which they are held when slid into position on the shaft 11' from the rightward end thereof. To the right of the position A in Fig. 4 the opening 16' is reduced in diameter as indicated at 16a, the reason for this being that the flows of water divide at the position A so that the flow of liquid through the rightward portion of the shaft has a volume or rate of flow only one-half of that in the leftward portion of the shaft. Likewise, the tube means disclosed in Fig. 1 is now made in two sections 26a and 26b, the section 26a, which extends from the swivel fitting 18' to the fitting 37', being of such internal diameter as to carry twice the quantity of water as the rightward section 26b which is of reduced diameter as shown.

I claim as my invention:

1. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position; a cylindrical body on said tube means in said first position having a diameter approximating that of said bore at said first position, said body having passage means to connect said first passage with said first port in said first position and the portion of said body which extends into said second passage having an opening lengthwise thereof so that flow through said second passage will not be obstructed; and means at said front end of said shaft communicating with said first and second passages whereby cooling liquid may be circulated through the same and through said chambers of said friction-heated walls.

2. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position; a cylindrical body on said tube means in said first position having a diameter approximating that of said bore at said first position, said body having a peripheral annular channel communicating with said first port in said first position and radial passage means connecting said annular channel with said first passage of said tube means and the portion of said body which extends into said second passage having an opening lengthwise thereof so that flow through said second passage will not be obstructed; and means at said front end of said shaft communicating with said first and second passages whereby cooling liquid may be circulated through the same and through said chambers of said friction heated walls.

3. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers; tube means extending through said bore and passing through said first position to said second position, the axial opening through said tube means forming a first passage and the annular space around said tube means within said bore forming a second passage which communicates with said second ports of said shaft member, there being an enlargement on said tube means between said first and second ports in said second position to provide a barrier between such ports, and the inner end of said first passage being connected to the first port in said second position; a cylindrical body on said tube means in said first position having a diameter approximating that of said bore at said first position, said body having a peripheral annular channel communicating with said first port in said first position and radial passage means connecting said annular channel with said first passage of said tube means and the portion of said body which extends into said second passage having an opening lengthwise thereof so that flow through said second passage will not be obstructed; and means at said front end of said shaft communicating with said first and second passages whereby cooling liquid may be circulated through the same and through said chambers of said friction-heated walls.

4. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers, said bore being of reduced diameter from said first position to said second position; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position, said tube means being also of reduced diamter from said first position to said second position; a cylindrical body on said tube means in said first position having a diameter approximating that of said bore at said first position, said body having passage means to connect said first passage with said first port in said first position and the portion of said body which extends into said second passage having an opening lengthwise thereof so that flow through said second passage will not be obstructed; and means at said front end of said shaft communicating with said first and second passages whereby cooling liquid may be circulated through the same and through said chambers of said friction-heated walls.

5. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers, said bore being of reduced diameter from said first position to said second position; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position, said tube means being also of reduced diameter from said first position to said second position; a cylindrical body on said tube means in said first position having a diameter approximating that of said bore at said first position, said body having a peripheral annular channel communicating with said first port in said first position and radial passage means connecting said annular channel with said first passage of said tube means and the portion of said body which extends into said second passage having an opening lengthwise thereof so that flow through said second passage will not be obstructed; and means at said front end of said shaft communicating with said first and second passages whereby cooling liquid may be circulated through the same and through said chambers of said friction-heated walls.

6. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers, said bore being of reduced diameter from said first position to said second position; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position, said tube means being also of reduced diameter from said first position to said second position; port means in said first position connecting said first passage with said first port in said first position, said port means being of such form and size as to permit a flow of liquid through said second passage from one side to the other of said first position; and means at said front end of said shaft communicating with said first and second passages whereby cooling liquid may be circulated through the same and through said chambers of said friction-heated walls.

7. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers, said bore being of reduced diameter from said first position to said second position; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position, said tube means being also of reduced diameter from said first position to said second position; port means in said first position connecting said first passage with said first port in said first position, said port means being of such form and size as to permit a flow of liquid through said second passage from one side to the other of said first position; and means at said front end of said shaft communicating with said first and second passages whereby cooling liquid may be circulated through the same and through said chambers of said friction-heated walls.

8. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, each first port being spaced in axial direction from each second port, and there being means for connecting said first and second ports to said first and second openings of said chambers; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position; port means in said first position connecting said first passage with said first port in said first position, said port means being of such form and size as to permit a flow of liquid through said second passage from one side to the other of said first passage; and means at said front end of said shaft communicating with said first and second passages whereby cooling liquid may be circulated through the same and through said chambers of said friction-heated walls.

9. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, and there being means for connecting said first and second ports to said first and second openings of said chambers; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position, said tube means having a lateral opening in said first position connected to said first port in said first position; and means at said front end of said shaft communicating with said first and second passages whereby cooling liquid may be circulated through the same and through said chambers of said friction-heated walls.

10. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, and there being means for connecting said first and second ports to said first and second openings of said chambers; tube means extending through said bore and passing through said first position to said second position, the axial opening through said tube means forming a first passage and the annular space around said tube means within said bore forming a second passage which communicates with said second ports of said shaft member, the inner end of said first passage being connected to the first port in said second position; a body slidable in said bore into said first position, said body engaging said tube means and the wall of said bore and having therein passage means to connect said first passage with said first port in said first position, said body being so formed that it will provide in said second passage an opening lengthwise thereof so that flow through said second passage will not be obstructed; and means at said front end of said shaft communicating with said first and second passages whereby cooling liquid may be circulated through the same and through said chambers of said friction-heated walls.

11. In a device of the character described, having at least a pair of friction devices, the combination of: a pair of annular rotatable friction-heated walls having chambers for a cooling liquid and first and second openings to provide inlet and outlet means for said chambers; a rotatable shaft member on which said walls are fixed, said shaft member having a bore extending in from one end thereof along the axis of the shaft member and through a first position near to said wall nearest the said end of said shaft member to a second position near to the other of said walls, and having in each of said positions a first and a second radial port, and there being means for connecting said first and second ports to said first and second openings of said chambers; a member slidable into said bore from the end thereof comprising tube means extending through said bore and passing through said first position to said second position, the axial opening through said tube means forming a first passage and the annular space around said tube means within said bore forming a second passage which communicates with said second ports of said shaft member; means on the inner end of said tube means to form a barrier between said first and second ports in said second position so that the inner end of said first passage will be connected to the first port in said second position, and a body slidable in said bore into said first position, said body engaging said tube means and the wall of said bore and having therein passage means to connect said first passage with said first port in said first position, said body being so formed that it will provide in said second passage an opening lengthwise thereof so that flow through said second passage will not be obstructed; and means at said front end of said shaft communicating with said first and second passages whereby cooling liquid may be circulated through the same and through said chambers of said friction-heated walls.

LEROY NEWCOMB.